United States Patent [19]

Chi

[11] 4,272,475

[45] Jun. 9, 1981

[54] PROCESS FOR THE LOW TEMPERATURE SHAPING PROCESSING OF POLYETHYLENE TEREPHTHALATE

[76] Inventor: Chang S. Chi, No. 29-3, Nishihara 3-chome, Shibuya-ku, Tokyo, Japan

[21] Appl. No.: 875,552

[22] Filed: Feb. 6, 1978

[30] Foreign Application Priority Data

Feb. 12, 1977 [JP] Japan .................................. 52/14414

[51] Int. Cl.$^3$ ............................................ D01F 11/00
[52] U.S. Cl. .................. 264/210.1; 264/553; 264/210.6; 264/211; 264/292; 264/320
[58] Field of Search ............ 264/320, 292, 211, 210.6, 264/210.1, 235.8, 500, 510, 513, 514, 539, 553; 260/2.3; 528/271–273

[56] References Cited

U.S. PATENT DOCUMENTS

| | | | |
|---|---|---|---|
| 2,244,208 | 6/1941 | Miles | 264/320 |
| 3,079,642 | 3/1963 | Needham et al. | 264/320 |
| 3,383,256 | 5/1968 | Carbone | 264/510 |
| 3,532,786 | 10/1970 | Coffman | 264/320 |
| 3,717,544 | 2/1973 | Valyl | 264/511 |
| 3,733,159 | 5/1973 | Coffman | 264/320 |
| 3,733,309 | 5/1973 | Wyeth et al. | 264/539 |
| 3,767,757 | 10/1973 | Vroom et al. | 264/320 |
| 3,883,631 | 5/1975 | Murray | 264/320 |
| 3,947,539 | 3/1976 | Lane | 264/320 |
| 3,954,923 | 5/1976 | Valyi | 264/37 |
| 3,977,153 | 8/1976 | Schrenk | 264/37 |
| 4,013,748 | 3/1977 | Valyi | 264/513 |
| 4,067,944 | 1/1978 | Valyi | 264/513 |
| 4,107,362 | 8/1978 | Valyi | 264/513 |
| 4,127,631 | 11/1978 | Dempsey et al. | 528/271 |

FOREIGN PATENT DOCUMENTS

| | | | |
|---|---|---|---|
| 2209932 | 9/1973 | Fed. Rep. of Germany | 264/37 |
| 37-15474 | 9/1962 | Japan | 264/328 |
| 37-15475 | 9/1962 | Japan | 264/328 |
| 47-49445 | 12/1972 | Japan | 264/176 Z |
| 48-28338 | 8/1973 | Japan | 264/325 |
| 51-84891 | 7/1976 | Japan | 260/2.3 |
| 51-97663 | 8/1976 | Japan | 264/328 |

*Primary Examiner*—Jay H. Woo
*Attorney, Agent, or Firm*—Darby & Darby

[57] ABSTRACT

Process for the low temperature shaping processing of polyethylene terephthalate which comprises preparing a polyethylene terephthalate shaping material having the predetermined shape by subjecting polyethylene terephthalate having an average molecular weight of at least 12000 to an extrusion moulding or injection moulding operation and, optionally, laminating a high polymer material, or metallic or inorganic material on the shaping material, pressing the shaping material or the laminate shaping material against a mould having the predetermined shape at a temperature of 0° to 240° C. under the conditions comprising a total processing pressure of 5 to 800000 kg, a unit pressure of 3 to 30000 kg/cm$^2$ and a processing rate of 2 to 10000 cm/min.

According to the above described process, a shaped article having toughness and uniform quality can be easily and cheaply obtained.

23 Claims, No Drawings

PROCESS FOR THE LOW TEMPERATURE SHAPING PROCESSING OF POLYETHYLENE TEREPHTHALATE

BACKGROUND OF THE INVENTION

The present invention relates to a process for producing shaped articles of polyethylene terephthalate (hereinafter referred to as "PET") by a low temperature shaping processing.

A high temperature shaping processing process (the term "high temperature" as herein used refers to a temperature above the melting point of PET) such as injection molding, extrusion moulding and the like has been heretofore adopted in the production of PET shaped articles. In the prior shaping process of this type, it was necessary to use a relatively high molecular weight PET whose average molecular weight is in the range of 20000 to 25000 or higher as a not-strengthened, pure PET or to reinforce PET with a significant amount (above 20%) of a glass fiber. However, even if the PET was reinforced in such manner and shaped, the PET had a tendency to be thermally deteriorated during its shaping, thereby resulting in a reduction in the average molecular weight thereof. For this reason, the resulting article was often fragile and non-uniform in quality. Thus, in some instances, it was impossible to produce high quality shaped articles with adequate stability. In addition, this process was costly.

Also, it has been heretofore considered that non-crystalline (not-strengthened) PET shaped articles do not find their suitable applications because of their low temperature (60° to 70° C.) of thermal deformation. Accordingly, no special attention has been paid to a low temperature (a temperature of from room temperature to the softening point of PET (240° C.)) shaping process for non-crystalline PET and a study of this subject has not been made, too, hitherto. Moreover, most of the conventional crystalline or strengthened PET shaped articles were those which were reinforced with a glass fiber. When these FR-PET shaped articles were subjected to a deforming processing at a low temperature, the glass fibers contained therein were cut or it was very difficult to deform the articles. Therefore, the low temperature processing has been considered to be very difficult to carry out. In addition, it was impossible to remove the disadvantages inherent in the PET in the shaped articles.

The inventors have previously made various proposals concerning a high temperature processing (injection moulding, extrusion moulding). As a result of their various studies to overcome the problems associated with such a high temperature processing process and the above described prior problems, the inventors have accomplished this invention.

SUMMARY OF THE INVENTION

It is an object of the present invention to provide a process for shaping polyethylene terephthalate materials consisting mainly of PET by a low temperature shaping method wherein non-crystalline (not strengthened) PET materials having a relatively low molecular weight whose average molecular weight is of the order of 12000 to 20000 can also be used, such PET materials can be easily, certainly and economically shaped into a tough shaped article, shaped articles having excellent physical properties suitable for use in various applications can be obtained, the deterioration of the PET during the shaping operation can be certainly prevented and at the same time the cost of energy and installation can be reduced, whereby even shaped articles whose shape is difficult to form by injection moulding or heavy and large-sized shaped articles or shaped articles which are produced in the same shape in a small quantity (below 5000) can be easily and cheaply produced, and it is possible to produce not only shaped articles having toughness and uniform quality, but also special shaped articles which could not have been realized by the prior art.

The low temperature shaping processing process according to the present invention comprises preparing a polyethylene terephthalate shaping material having the predetermined shape by subjecting polyethylene terephthalate having an average molecular weight of at least 12000 to an extrusion moulding or injection moulding operation and pressing the shaping material against a mould having the predetermined shape at a temperature of 0° to 240° C. under the conditions comprising a total processing pressure of 5 to 800000 kg, a unit pressure of 3 to 30000 kg/cm$^2$ and a processing rate of 2 to 10000 cm/min.

DETAILED DESCRIPTION

In the present invention, an extrusion moulded or injection moulded material of polyethylene terephthalate (PET) having an average molecular weight of at least 12000 is used as a shaping material. The term "PET" as used herein denotes polymers consisting mainly of polyethylene terephthalate which comprise at least 80% of polyethylene terephthalate and at most 20% of its isomers or similar polyesters.

The PET shaping material used in the present invention may be materials moulded from fresh (virgin) PET chips or pellets suitable for use in the production of fibers or films. The shaping material may also be prepared by using chips or pellets obtained by regenerating PET scraps produced during moulding or PET waste shaped articles or these materials in a pulverized form by means of an extruder. In this case, the fresh material, scrap and waste may be used singly or in combination. The PET material which may be used in the present invention has an average molecular weight of at least 12000. In order to obtain shaped articles having higher toughness, it is preferable that the PET material has an average molecular weight of at least 16000, the average molecular weight of at least 20000 being more preferable. However, according to the present invention, excellent shaped articles can be obtained even if PET materials having a relatively low average molecular weight below 20000 are used. PET materials having a high average molecular weight of at least 30000 may also be used. However, the use of such a PET material having a high average molecular weight is disadvantageous from an economical point of view. Moreover, in accordance with the present invention, it is possible to obtain shaped articles having toughness and excellent properties without the use of such a PET having a high average molecular weight. On the other hand, when a PET material having an average molecular weight less than 12000 is used, it is difficult to obtain shaped articles having satisfactory toughness and strength, and thus, such a PET material is unfavorable. Of course, a non-crystalline PET material may be shaped provided that it has an average molecular weight of at least 10000.

In addition to the above mentioned PET, the starting material for use in producing a shaping material may contain other high polymers, or reinforcing agents or fillers, or mixture thereof. Examples of the high polymers are nylon 6, nylon 66, nylon 610, nylon 8, polybutylene terephthalate (PBT), polyethylene, polypropylene, ABS resins, cotton, rayons and hemp. Examples of the reinforcing agents or fillers are glass fibers, glass beads, glass powders, quartz, talc, cement, and powders and fibers of carbon, iron, copper, titanium oxide, molybdenum and aluminum and any other materials which are compatible with the PET. In this case, the quantity of other high polymer added should be not greater than 50% by weight of the total weight of the final shaped article. The other high polymer may also be added in excess of the above described level. However, in this case, the final shaped article whose PET properties are poor is obtained. Accordingly, the above described upper limit should not be exceeded. On the other hand, it is preferable that the lower limit be 3% by weight. Moreover, as the other high polymer, its scrap or waste as well as its fresh material may be used.

The quantity of reinforcing agent of filler added should be not greater than 40% by weight, preferably not greater than 20% by weight, of the total weight of the final shaped article. In the case where an inorganic filler is added in excess of such a level, the resulting shaping material tends to become fragile and it is thus difficult to press-shape it, whereby it is difficult to obtain the final shaped article having excellent properties. Accordingly, the above described upper limit should be observed. In addition, when a glass fiber is added, its quantity should be not greater than 35% by weight from the standpoint of formability.

Furthermore, in the case where the other high polymer and reinforcing agent or filler are added to the PET, the total quantity of these additives added should be not greater than 60% by weight, preferably not greater than 30% by weight, of the total weight of the final shaped article.

If necessary, other additives such as pigments, dyes, fire-retarding chemicals and deterioration preventing agents may also be incorporated into the PET in conjunction with the above described high polymer or filler.

Then, a shaping material of PET suitable for use in a low temperature press shaping is prepared by forming the above described starting material into a shaped article having the predetermined shape by means of an extrusion moulding or injection moulding method. This will now be explained in the following. For example, an extruded shaping material in the form of a film or plate having the predetermined shape and thickness, or a rod having the predetermined shape and size is produced by extruding the starting material through an extruder under conditions such that the water content of the starting material is not greater than 0.1% by weight in the case where a conventional extruder is used or not greater than 1% by weight in the case where a vent type extruder is used; the interior of the cylinder of the extruder is maintained at a reduced pressure of not greater than 100 mm Hg; the temperature of the cylinder is the melting point of the resin ±35° C., preferably ±25° C.; the residence time of the resin within the cylinder is not greater than 10 minutes, preferably not greater than 5 minutes; the nozzle temperature is a temperature of from the melting temperature of the resin minus 5° C. to the melting temperature of the resin plus 20° C.; and the variation in temperature of the resin extruded from the nozzle is maintained within ±3° C.

An injection molded shaping material in the form of a relatively thick plate or a product having a shape which can not easily be formed by means of an extrusion moulding method is produced by subjecting the starting material to injection moulding under conditions such that the water content of the starting material is not greater than 0.1% by weight in the case where a conventional injection moulding machine is used or not greater than 0.5% by weight in the case where a vent type injection moulding machine is used; the interior of the cylinder of the machine is maintained at a reduced pressure of not greater than 100 mm Hg; the cylinder temperature is the melting temperature of the resin ±30° C.; the residence time of the resin within the cylinder is not greater than 15 minutes, preferably not greater than 10 minutes; the variation in temperature of the resin injected from the nozzle is maintained within ±5° C., preferably ±3° C.; the mould temperature is set to the predetermined temperature of 10° to 100° C. and the variation of this temperature is maintained within ±5° C.; the capacity of the mould is at least 30% by volume, preferably at least 50% by volume, of the maximum injection volume of the injection moulding machine; and the shot time is not greater than 3 minutes, preferably not greater than 2 minutes, more preferably not greater than 1 minutes.

In the case where a vent type moulding machine is not used in the injection moulding or extrusion moulding, more excellent shaping materials can be obtained by blowing a nitrogen gas into a hopper delivering the starting material PET in the countercurrent to the delivery direction of the starting material.

Furthermore, in order to obtain a shaping material of non-crystalline PET, the molten resin extruded or injected from the nozzle is rapidly cooled to a temperature of 10° to 75° C. By doing this, it is possible to a shaping material having high toughness and excellent low temperature pressure formability. On the other hand, if a highly heat-resistant shaping material in which the PET is crystallized to a high degree is to be obtained, it is preferable that the molten resin leaving the nozzle is crystallized by solidifying it at a temperature of 120° to 160° C., preferably 130° to 150° C.

The extruded or injected shaping material moulded under the above described moulding conditions scarcely suffers from the deterioration of the PET during the extrusion or injection moulding, and it is tough and uniform in its quality and has excellent deep drawing property. Accordingly, the shaping material is very suitable for a low temperature pressure processing. When the shaping material is subjected to a pressing and deforming operation at a low temperature, it can be easily and certainly processed into a final shaped article having excellent quality without failure. Therefore, it is preferable to use the PET shaping material obtained from the extrusion or injection moulding of the PET moulding material under the above described moulding conditions. Particularly, because of their high deep drawing property, a shaping material in which the PET is not or slightly crystallized and a shaping material containing a small quantity (not greater than 10) of the reinforcing agent or filler are more easily shaped. Of course, a shaping material containing a large quantity (30 to 40%) of the reinforcing agent or filler and a shaping material in which 20 to 40% of the PET is crystallized may also be shaped provided that these materials are subjected to pre-heat treatment.

The PET shaping material used is of a film, plate or bar form. But, the shaping material may assume any other shape depending upon the shape of the final shaped article.

Also, a laminate shaping material can be prepared by superposing a laminating material (in the form of a plate a yarn, a cotton, a cloth and a bar) of other polymers (nylon 6, nylon 66, nylon 610, nylon 8, polypropylene, polystyrene, ABS resins, cotton, rayons, hemp, polycarbonate, polyacetal, polyvinyl chloride, polyvinyl alcohol and PET) or a laminating material (in the form of a plate and a bar) of metals or inorganic substances (iron, steel, stainless steel, aluminum, marble, ceramics, glass, and cement) on the above described pure PET shaping material, PET shaping material to which the above described high polymer is added or PET shaping material to which the reinforcing agent or filler is added (in the form of a plate, a film and a bar). In this case, the other high polymer, or metallic or inorganic material may be laminated on one or both surfaces of the PET shaping material or it may be sandwiched between the PET shaping materials or several kinds of laminating material may be laminated on the PET shaping material as a substrate. In this case, any appropriate adhesives (for example, polyvinyl alcohol, various epoxy resins, and unsaturated polyester resins) may also be interposed between the laminated materials. By doing this, the low temperature shaping processing of the laminated materials becomes more easy. Also, metal powders may be interposed between the laminated materials to improve their thermal conductivity during pre-heating. The pre-heating of the laminate material can be effectively carried out by the use of a hot air, an electric heater, infrared rays, a metal sheet, a high frequency and the like. These heating methods may also be used in combination.

In the case where the laminate shaping material containing the PET as a substrate is subjected to the low temperature shaping, it is preferable that the PET content of the material should be not less than 20% by weight based on the weight of the material (or product) if the other high polymer is laminated and it should be not less than 10% by weight based on the weight of the material (or product) if the metallic or inorganic material is laminated. In other words, it is preferable that the content of the high polymer material is less than 80% by weight and the content of the metallic or inorganic material is less than 90% by weight. Of course, a sandwitch shaping material with a higher content of these materials may be prepared. However, as the PET content is decreased, the characteristics of the PET are diminished. Accordingly, it is desirable that the PET content is in the range of 30 to 50% by weight or more.

The above described shaping materials (the PET shaping material and the laminate shaping material) are subjected to the low temperature shaping processing according to the following process. The shaping material having the predetermined shape is pressed against a mould corresponding to the shape of the final shaped article by means of a suitable press means at room temperature of the predetermined temperature of not greater than the melting temperature of the resin but less than the intermediate temperature (235° to 240° C.) between the melting point and the softening point of the resin under the conditions comprising a processing pressure (a total pressure of the machine) of 5 to 800000 kg< a processing pressure per unit area of 2 to 35000 kg/cm$^2$>, a processing rate of 2 to 10000 cm/min. and a fixed pressure of 50 to 2000 kg. In this manner, the shaping material is press-shaped into the desired shaped article at a low temperature (from 0° C. to a temperature less than the intermediate temperature (about 235° to 240° C.) between the softening point of the resin and the melting point thereof).

In this case, if the PET of the shaping material is non-crystalline or has only a low crystallinity, the shaping material can be easily press-shaped at a shaping temperature less than the approximate second order transition temperature of the PET, more specifically less than 80° C. In particular, a sheet having a thickness of not greater than 3 mm can be certainly shaped at room temperature (0° to 40° C.), while a sheet having a thickness of 3 to 5 mm can be certainly shaped at a temperature of not greater than 60° C. On the other hand, a shaping material in which the PET has a high crystallinity or a shaping material into which the reinforcing agent or filler is incorporated is subjected to a press-shaping operation at a temperature of not less than 70° C. but less than a temperature intermediate between the softening point of the resin and the melting point thereof depending upon the degree of crystallinity and the type and content of the reinforcing agent or filler. In particular, it is preferred that a shaping material in which the PET has a very high degree of crystallinity or a shaping material containing not less than 10% by weight of the filler is pre-heated to a temperature of at least 70° C. before its press-shaping operation.

The low temperature pressure processing conditions are more concretely shown in Table 1.

TABLE 1

| | Shaping temperature °C. | Processing pressure kg/cm$^2$ | Processing rate cm/min |
|---|---|---|---|
| 1 | 0–40 | 20–20000 | 2–500 |
| 2 | 40–60 | 10–15000 | 5–500 |
| 3 | 60–80 | 5–12000 | 10–1000 |
| 4 | 80–120 | 3–10000 | 20–2000 |
| 5 | 120–160 | 2–6000 | 30–3000 |
| 6 | 160–200 | 2–4000 | 30–5000 |
| 7 | 200–240 | 2–2000 | 50–10000 |

When the laminate shaping material is pre-heated during its press-shaping operation, the heating temperature should be less than the softening point of the respective materials. A mould for processing a sheet-shaped material is preferably maintained at a temperature 5° to 20° C. lower than the pre-heating temperature of the material. When a bar-shaped shaping material is shaped, the shaping material is, sometimes, first formed into a screwlike article at its approximate melting point and the article is then subjected to a finishing operation using a low temperature mould (30° to 100° C.). When the shaping material is pre-heated, it is necessary to pre-heat it as rapidly as possible and uniformly.

With regard to a processing pressure:

The size of a processing machine such as a press may be determined from an economical view of point depending upon the size and physical properties of the shaping material to be processed. When the shaping material to be processed is large-sized, a press having a weight of not less than 800 tons (800000 kg) may be used. A pressure per unit area ranging from 2 to 35000 kg/cm$^2$ is satisfactory. In the case where the shaping material is shaped in combination with the metal material, a maximum unit pressure of 100000 kg/cm$^2$ may be used, but a unit pressure of the order of 10 to 2000 kg/cm$^2$ is ordinarily used. When the shaping material consist only of high polymers, a unit pressure in the range of 20 to 600 kg/cm$^2$ is preferred. In general it is preferable to pre-heat a shaping material to a suitable temperature (50° to 240° C.) and to shape it at a low unit pressure of the order of 5 to 500 kg/cm$^2$ in place of the use of a high processing pressure (1000 to 100000 kg/cm$^2$) because the former processing process results in a faster shaping rate and a lower cost of the port-treatment and processing installations. However, when a shaping material is used in combination with the metal material or a special product having a particularly high strength is to be produced, the use of a relatively high pressure (1000 to 100000 kg/cm$^2$) results in a rolling effect which is not provided by the high temperature shaping process. As can be seen from the foregoing, with respect to the processing pressure, a most advantageous pressure may be selected from the range of 2 to 100000 kg/cm$^2$ depending upon the type of the starting material, the size and physical properties of the product to be obtained and economical requirements. When a high pressure (above 10000 kg/cm$^2$) is used, a momentary pressure is generally sufficient and a pressure application time exceeding 30 seconds is unnecessary.

In the processing under the above described conditions, an extrusion or injection moulded material after being completely cooled may be used as a shaping material. Alternatively, the extrusion or injection moulded material may be continuously processed immediately after its moulding or after its cooling for a decreased period of time. Also, after the extrusion or injection moulded material is once cooled, it may be immediately shaped by means of a rolling mould or machine. In either cases, the processing conditions are suitably selected within the above described condition ranges depending upon the physical properties and shape required by the final shaped article. In this case, when the moulding and low temperature shaping processing of the shaping material are continuously carried out, the shaping material may also be intermittently or continuously subjected to the low temperature pressure processing immediately after the shaping material is cooked to such a degree that it can be removed from a mould or die or after it is cooled to an adequate degree in water or the prescribed aqueous solution if its cooling is not sufficient, depending upon the physical properties and shape of the final shaped article even if the shaping material is not cooled initially to a sufficient degree. According to this process, it is possible to reduce a loss of energy and to increase the shaping rate. Moreover, if the shaping material is rolled by means of a press or roller, the degree of orientation of the PET molecules is increased and a stretching effect results, whereby a more tough shaped article can be obtained. In this case, the shaping material (for example, a plate material) after being cooled to a some degree may be subjected to a low temperature shaping operation by applying one or few runs of pressing operation to the shaping material. When few runs of pressing or rolling are continuously effected, a stretching effect is further increased, whereby a tough and excellent shaped article can be obtained.

According to the above shaping conditions, even if the shaping material is deformed under pressure, it is not broken and an excellent shaped article possessing a low residual stress is obtained. Also, by utilizing the fact that the physical properties of the shaping material can vary depending upon the degree of crystallinity of the PET contained therein and the type and quantity of the filler to be mixed therein, the shaping material can be easily processed under a slight heat and pressure. Moreover, if the PET molecules of the shaping material are highly oriented in combination with such a utilization of the relation between the intermolecular bond strength of the PET, and temperature and pressure, the degree of crystallinity of the PET is increased and the strength thereof is increased, which makes it possible to obtain easily a good shaped article having excellent physical properties by the low temperature shaping processing.

In addition, if the shaped article obtained from the low temperature shaping processing is subsequently subjected to an appropriate heat treatment as required, an annealing effect results which decreases the residual stress of the article and increases the temperature of heat deformation thereof. Ordinarily, the heat treatment is preferably carried out at a temperature of 60° to 200° C. for a period ranging from 30 minutes to 30 seconds. Although a conventional electrical heating may be effectively used in heating, an infrared lamp is more effective because of its shorter period of heating. During the processing, if necessary, a lubricant which is non-toxic and has no adverse effect on the physical properties of the PET such as glycerine, can be used.

In this way, the present invention enables shaped articles to be produced simply, certainly and economically by the low temperature shaping processing. That is, when the PET is shaped at a high temperature (above the melting point of the PET), the PET tends to decompose and deteriorate and becomes fragile, so tat it is difficult to produce a shaped article having toughness and uniform physical properties unless the shaping conditions are strictly controlled. In contrast, because the present invention uses a low shaping temperature (0° to 240° C.), a reduction in the average molecular weight of the PET due to its thermal and oxidation deterioration is not caused during shaping, and the shaped article obtained is uniform in physical property and tough. Moreover, when the shaping material is subjected to a rolling processing, a shaped article having high strength can be easily obtained, because the low temperature pressure stretching results in a stretching effect which improves the orientation of the PET molecule and promotes the crystallization thereof. Also, when a shaped article having a heavy weight (above 3 to 5 kg), a large size (for example, an area above 100 cm × 100 cm) or a great thickness (above 5 mm) is shaped in the high temperature shaping process, the melting of a shaping material by heating requires a long period of time and the cooling of the shaped article after the shaping operation also requires a considerable period of time, which contributes to the deterioration of the PET. Further, large-sized mechanical equipments are required and the mould is also costly. In contrast, according to the present invention, a heavy, large-sized or thick shaped article can be produced without the possibility of thermal deterioration and any shaped article can be simply shaped irrespective of its weight, shape and thickness. Similarly, various shaped articles to be produced in a small quantity (for example, 10 to 10000 pieces) or shaped articles having a special shape which is difficult to produce by an injection moulding can be easily shaped. In addition, according to the low temperature shaping processing of the present invention, a great loss of thermal energy due to heat melting of the shaping material and cooling of the shaped product as is encountered in the high temperature shaping processing is avoided and the shaping time (rate) of the shaping material can be shortened and at the same time the cost of the processing equipments such as a shaping machine and a mould is low and the productivity is high.

As described above, according to the present invention, even if non-crystalline (not-strengthed) PET having a relatively low molecular weight whose average molecular weight is of the order of 12000 to 18000 or 20000 is used, a tough shaped article can be simply and economically shaped. Also, the low temperature pressure processing treatment of the present invention results in a stretching effect which makes it possible to produce shaped articles having excellent physical properties suitable for various applications. Further, according to the present invention, the disadvantages of the high temperature shaping can be eliminated and the deterioration of the PET during shaping can be certainly prevented. At the same time, the cost of energy and the equipments can be reduced. In addition, a shaped article having a special shape which can not easily be produced by injection moulding and a heavy or large-sized shaped article can be easily and cheaply produced. The shaped articles thus obtained are uniform in quality.

Also, by subjecting the laminate shaping material consisting of the PET shaping material on which other high polymer material or a metallic or inorganic material is laminated to the low temperature shaping processing, an excellent shaped article having distinctive characteristics which can not be provided by the PET or other resins alone can be obtained. Such a shaped article can be used in various new applications.

Examples of the shaped article produced from the laminate material are as follows:

(1) A helmet is produced by interposing a cotton layer having a thickness of 5 to 15 cm between a steel plate and the PET shaping material and shaping the resulting sandwich. The helmet thus produced is heat insulating and excellent in impact resistance. It also serves to repulse a needle or bullet.

(2) A cover of a drain or water conduit is produced by shaping a sandwich consisting of steel and the PET shaping material (optionally, containing not greater than 10% of a glass fiber or quartz). This cover is characterized by being tough and light.

(3) A wall material having excellent soundproofness is produced by sandwich-shaping the PET shaping material (optionally, containing not greater than 5% of a glass fiber or quartz) and a polystyrene foam.

(4) A distributing board having high heat resistance and electricity resistance is produced by sandwich-shaping the PET shaping material (optionally, containing not greater than 5% of a glass fiber or quartz) and a marble plate.

(5) An excellent insulator is produced by spreading earthenware powders and an epoxy resin on the PET shaping material (optionally, containing not greater than 10% of a glass fiber and 5% of quartz) in the form of a bar or suitable shape and shaping the coated material.

(6) A case for a storage battery is produced by sandwich-shaping an AS resin or vinyl chloride resin and the PET shaping material (optionally, containing not greater than 5% of a glass fiber).

(7) Production of a strengthened glass

A strengthened glass plate or reinforced PET plate is produced by interposing a PET film, sheet or plate between glass plates and shaping the resulting sandwich or by coating one or both surfaces of a glass plate with the PET shaping material (in the form of a film, sheet or plate) by means of the low temperature pressure processing or adhesion. This strengthened plate is considered to be a cheap and tough product having a wide variety of applications such as a building material (a strengthened window glass) and an automobile window glass.

(8) A strengthened box or meter- or gauge-cover having heat resistance is produced in the same manner as that described in (7).

(9) The above described high polymers and inorganic materials superimposed in several layers can be shaped and the resulting materials or products have characteristic physical properties.

(10) The scraps (fibers) of the PET or tetron cloths (including a mixed cloth consisting of nylon and cotton, rayon and hemp) cut to an appropriate length may be mixed with cement, sand or stone, iron wire and water to provide reinforced concrete. This reinforced concrete may be suitable for use in a water pipe of a drainage, a break water, and a floor and roof of buildings. Although the PET or mixed cloth used for reinforcing the concrete may be effective in a quantity of 1 to 2% based on the total weight of the concrete, it is ordinarily used in a quantity of 3 to 15%. The PET or mixed cloth has heat insulation, sound proofness, protection against electricity and protection against crack effects. The above described scraps or mixed cloths may be shaped into filaments or any shaped article having a suitable shape by extrusion or injection moulding before they are used in reinforcing cement or concrete.

The present invention will be illustrated in more detail by the following examples.

EXAMPLE 1

I. The moulding conditions of a shaping material
  A. Injection moulding
   (1) A starting material is dried at a temperature of 130° to 135° C. for 4 to 5 hours, the water content of the PET is less than 0.05%
   (2) Cylinder temperature—230° to 290° C.
   (3) Nozzle temperature—265° to 275° C.
   (4) Injection pressure—600 to 800 kg/cm$^2$
   (5) Mould temperature—30° to 50° C.
   (6) One shot time—30 to 35 seconds Shaping materials in the form of a plate (thick about 1 mm), a bowl (having an outer diameter of 153 mm, a depth of 81.4 mm and a thickness of 2 mm) and a bell (having an inner diameter of 7.4 cm, a height of 12.6 cm and a thickness of 2.2 mm) which have the compositions indicated in Table 2 were produced by injection moulding under the above described conditions.

B. Extrusion moulding
   (1) A vent type extruder is used, a starting material is not pre-dried, the water content of the PET is in the range of 0.4 to 0.8%
   (2) Degree of reduced pressure—100 mmHg
   (3) Cylinder temperature—230° to 290° C.
   (4) Die temperature—265° to 275° C.
   (5) Revolution number of a screw—100 to 200 r.p.m.
   (6) Cooling water—20° to 40° C.

Shaping materials in the form of a bar having the compositions indicated in Table 2 were produced by extrusion moulding under the above described conditions.

TABLE 2

| No. | Composition | Average molecular weight of PET | Moulding | Shape of shaping material |
|---|---|---|---|---|
| 1 | PET | About 13500 | Injection | Bowl |
| 2 | PET | About 13500 | " | Bell |
| 3 | PET | About 25000 | " | " |
| 4 | PET | About 17500 | " | " |
| 5 | PET + BN1% | About 25000 | " | " |
| 6 | PET | About 13500 | " | Plate |
| 7 | PET | 13500–15000 | " | " |
| 8 | PET + GF 10% | 13500–16000 | " | " |
| 9 | PET + GF 10% + Quartz 10% | " | " | " |
| 10 | PET + GF 10% + Quartz 10% | " | " | " |
| 11 | PET + GF 20% + Quartz 10% | " | " | " |
| 12 | PET | 13500–14000 | Extrusion | Bar |
| 13 | PET | 16000–17000 | " | " |
| 14 | PET + GF 20% | 13500–16000 | " | " |
| 15 | PET+ PP 20% | " | " | " |
| 16 | PET + PE 20% | " | " | " |
| 17 | PET + nylon 40% | " | " | " |

Note:
BN boron nitride
GF glass fiber
PP polyproylene
PE polyethylene

II Low temperature shaping processing
The above described shaping materials (Nos. 1 to 17) were subjected to a low temperature shaping processing under the following conditions.

| No. | Processing temperature | Pressure (kg) | Processing rate | Shape and evaluation after processing | |
|---|---|---|---|---|---|
| 1 | 20–35° C. | 8200 | 15–25 cm/min. | flat | Fracture due to flatting was not observed |
| 2 | " | 8700 | " | " | |
| 3 | " | 8700 | " | " | |
| 4 | " | 25700 | " | " | |
| 5 | " | 27000 | " | " | |
| 6 | " | 300–600 | " | Cylinder with a bottom (an inner diameter of 5.3 to 5.5 cm, a depth of about 2 cm) | |
| 7 | 60° C. | 300–600 | 25–100 cm/min. | Cylinder with a bottom (an inner diameter of 5.3 to 5.5 cm, a depth of about 2 cm) | |
| 8 | 80° C. | 300–800 | " | Cylinder with a bottom (an inner diameter of 5.3 to 5.5 cm, a depth of about 2 cm) | |
| 9 | 100° C. | " | 50–200 cm/min. | Cylinder with a bottom (an inner diameter of 5.3 to 5.5 cm, a depth of about 2 cm) | |
| 10 | 150° C. | 500–1000 | 80–300 cm/min. | Cylinder with a bottom (an inner diameter of 5.3 to 5.5 cm, a depth of about 2 cm) | |
| 11 | 200° C. | " | " | Cylinder with a bottom (an inner diameter of 5.3 to 5.5 cm, a depth of about 2 cm) | |
| 12 | 20–35° C. | | bending rate 20–30 times/min. | bending processing of 320° | (No fracture by more than ten times of bending) |
| 13 | " | | bending rate 20–30 times/min. | bending processing of 320° | (No fracture by more than ten times of bending) |
| 14 | " | | bending rate 20–30 times/min. | bending processing of 320° | (fracture by two times of bending) |
| 15 | " | | bending rate 20–30 times/min. | bending processing of 320° | (no fracture by more than five times of bending) |
| 16 | " | | bending rate 20–30 times/min. | bending processing of 320° | (no fracture by more than five times of bending) |
| 17 | " | | bending rate 20–30 times/min. | bending processing of | (no fracture by more than five times of |

-continued

| No. | Processing temperature | Pressure (kg) | Processing rate | Shape and evaluation after processing |
|-----|------------------------|---------------|-----------------|---------------------------------------|
|     |                        |               |                 | 320° bending)                         |

III Low temperature shaping processing

A. Rolling processing by a vise When the products Nos. 2, 3, 6, 7, 12, and 13 shown in Table 2 were rapidly and strongly rolled by means of a vise, these materials could be deformed without causing any crack. Further, when these materials were shaped into another mould, testpiece or gear in the same manner and the shaped articles were flattened under pressure, they could be deformed without causing any crack.

B. When the above described products were strongly struck with a hammer, they deformed, but no fracture was observed.

C. When an iron pipe having a diameter of ⅜" was pierced into the product in the form of a bell (No.3 in Table 2) and impact was applied to the bell several times, the pipe penetrated through the bottom of the bell and the pipe and the bell (the PET) were adhered to each other at the bottom portion and the other portions of the bell were not fractured. Indeed, this material is equal to or more excellent than polycarbonates in respect of elasticity and toughness. Accordingly, when the PET of a shaping material is non-crystalline, the shaping material can be subjected to the low temperature processing in every manners.

D. When the shaped article described in C was suddenly crushed by a crane, it was only deformed, but it did not crack.

E. When the products and testpieces of Nos.6, 7, 12, and 13 shown in Table 2 were rapidly bent to an angle of 340° to 350+ by hands, they were not completely fractured until they were bent 30 to 100 times. Accordingly, these products were remarkably tough.

F. When the products Nos. 2 and 3 (in the form of a bell) shown in Table 2 were laid and strongly stroke with an iron pipe or hammer, they were not easily fractured and sprung up to a height of 4 to 5 m.

G. When the products described in F were strongly thrown on a concrete ground by hand like a baseball, they sprung up to a height as high as 5 to 10 m and were not easily fractured. Because these shaping materials produced as stated above is tough, they can be easily shaped by means of any mould. Although there exist various methods for determining the average molecular weight of the PET, a viscosity method was used herein. Even if the shaping plate material of non-crystalline PET produced according to the present invention contains about 5% of a glass fiber or quartz, it can be worked in the same rate as the cutting rate of a metal when it is punched or cut. Even if the shaping material in the form of a bar or circle contains not greater than 30% of a glass fiber, it can be machined by a lathe or shaper like a metal.

As stated earlier, if a PET shaping material is produced according to the process of the present invention, the shaping material can be subjected to the low temperature processing according to the above described methods. It is to be understood that the process of the present invention can not be applied to shaping materials produced according to any processes other than the present process unless these materials have an average molecular weight of at least 15000 or the gravity of the PET crystal thereof is at most 30% or they have strength higher than the standard. The product produced by the above described low temperature processing did not deform even after the lapse of about 1½ to 2 years and it had still a high impact strength.

EXAMPLE 2

A PET plate material 3 mm thick (the PET has an average molecular weight of 16000 to 18000) produced by extrusion moulding or injection moulding in the same manner as that described in Example 1 was laminated with a cotton layer having a thickness of 10 mm, onto which a steel plate having a thickness of 2 mm was further laminated to produce a laminate shaping material. This laminate material was shaped at a processing rate of 1.5 m/min. under a processing pressure of 50000 kg into a helmet having an inner diameter of 20 cm and a depth of 20 cm of which the inside was the PET material.

A helmet previously produced by shaping a steel plate having a thickness of 1.5 to 3 mm was laminated with a cotton layer having a thickness of 10 to 20 mm at the interior thereof. Then, a PET plate shaping material 3 mm thick (the PET has an average molecular weight of 15000 to 17000) produced by extrusion moulding or injection moulding in the same manner as that described in Example 1 was superimposed on the cotton layer of the laminated helmet at a rapid processing rate of 150 cm/min. under a pressure reading of a press of 10000 to 30000 kg (300 to 900 kg/cm$^2$). In this case, the helmet could be shaped more rapidly than by the preceding processing process.

I claim:

1. A process for the low temperature shaping of polyethylene terephthalate, which comprises:
    molding a starting material comprising polyethylene terephthalate having an average molecular weight of at least 12,000 into a shaped article having a predetermined initial shape by a molding process selected from the group consisting of extrusion and injection molding;
    solidifying said shaped article; and
    pressing the solidified shaped article having said initial shape against a mold having a predetermined three-dimensional second shape to form a final shaped article having said second shape at a temperature between about 0° to about 240° C., said temperature being dependent upon the crystallinity, thickness and filler content of said article and being the highest of
    a temperature between about 0° and about 40° C. when the thickness of the first shaped article is below 3 mm, a temperature between about 40° C. and 60° C. when the thickness of said first shaped article is in the range from 3 mm to 5 mm, a temperature between about 60° C. and 240° C. when the thickness of said first shaped article is greater than 5 mm, a temperature below 80° C. when the starting material is non-crystalline or of low crystallinity, a temperature between 70° C. and 240° C. when the material is of high crystallinity, and a temperature between 70° C. and 240° C. when the filler content is at least 10% by weight of the starting material, the pressing operation being performed with a unit pressure and a processing rate dependent upon the temperature and within the following parameters:

when said temperature is between about 0° and 40° C., employing a unit pressure of about 20 to 20,000 kg/cm$^2$ and processing rate of about 2 to 500 cm/min., when said temperature is between about 40° and 60° C., employing a unit pressure of about 10 to 15,000 kg/cm$^2$ and processing rate of about 5 to 500 cm/min., when said temperature is between about 60° to 80° C., employing a unit pressure of about 5 to 12,000 kg/cm$^2$ and a processing rate of about 10 to 1,000 cm/min., when said temperature is between about 80° and 120° C., employing a unit pressure of about 3 to 10,000 kg/cm$^2$ and a processing rate of about 20 to 2,000 cm/min., when said temperature is between about 120° to 160° C., employing a unit pressure of about 2 to 6,000 kg/cm$^2$ and a processing rate of about 30 to 3,000 cm/min., when said temperature is between about 160° to 200° C., employing a unit pressure of about 2 to 4,000 kg/cm$^2$ and a processing rate of about 30 to 5,000 cm/min., and when said temperature is between about 200° to 240° C., employing a unit pressure of about 2 to 2,000 kg/cm$^2$ and a processing rate of about 50 to 10,000 cm/min.

2. A process as defined in claim 1, wherein the starting material comprises polyethylene terephthalate containing at least one high polymer material selected from the group consisting of nylon 6, nylon 610, polyethylene, and ABS resins in a quantity not greater than 50% by weight of the shaped article.

3. A process as defined in claim 1, wherein the starting material comprises polyethylene terephthalate containing at least one reinforcing agent or filler selected from the group consisting of glass fiber, glass bead, glass powder, quartz, feldspar, cement, carbon, iron, copper, titanium oxide, molybdenum, aluminum, cotton, rayon and hemp in a quantity not greater than 40% by weight of the shaped article.

4. A process as defined in claim 1, wherein the starting material comprises polyethylene terephthalate containing a high polymer material from the group consisting of nylon 6, nylon 610, polyethylene, and ABS resins; and a reinforcing agent or filler selected from the group consisting of glass fiber, glass bead, glass powder, quartz, feldspar, cement, carbon, iron, copper, titanium oxide, molybdenum, aluminum, cotton, rayon and hemp, the combination being present in a total quantity not greater than 60% by weight of the shaped article, while the high polymer material is present in a quantity not greater than 50% by weight and the reinforcing agent or filler is present in a quantity not greater than 40% by weight.

5. A process as defined in claim 1, wherein a starting material in which the PET has a very high degree of crystallinity or a starting material containing the filler not less than 10% by weight is pre-heated to a temperature of at least 70° C. before its press-shaping operation.

6. A process as defined in claim 1, wherein a mold is used for processing a sheet-shaped material and is maintained at a temperature 5° to 20° C. lower than the preheating temperature of the material.

7. A process as defined in claim 1, wherein extrusion or injection molded material is continuously processed immediately after its molding or after its cooling for a decreased period of time.

8. A process as defined in claim 1, wherein the starting material, after being cooled to some degree, is subjected to a low temperature shaping operation by applying one or more runs of a pressing operation.

9. A process for the low temperature shaping of polyethylene terephthalate which comprises:

molding a starting material comprising polyethylene terephthalate having an average molecular weight of at least 12,000 into a shaped article having a predetermined initial shape by a process selected from the group consisting of extrusion and injection molding;

laminating a bonding material to said shaped article to conform to at least a portion of the surface thereof to thereby form a laminated article; and pressing the laminated article having said initial shape against a mold having a predetermined three-dimensional second shape to form a final shaped article having said second shape at a temperature between 0° to about 240° C., said temperature being dependent upon the crystallinity, thickness and filler content of said article and being the highest of a temperature between about 0° and about 40° C. when the thickness of the first shaped article is below 3 mm, a temperature between about 40° C. and 60° C. when the thickness of said first shaped article is in the range from 3 mm to 5 mm, a temperature between about 60° C. and 240° C. when the thickness of said first shaped article is greater than 5 mm, a temperature below 80° C. when the starting material is non-crystalline or of low crystallinity, a temperature between 70° and 240° C. when the material is of high crystallinity, and a temperature between 70° C. and 240° C. when the filler content is at least 10% by weight of the starting material, the pressing operation being performed with a unit pressure and a processing rate dependent upon the temperature and within the following parameters:

when said temperature is between about 0° and 40° C., employing a unit pressure of about 20 to 20,000 kg/cm$^2$ and processing rate of about 2 to 500 cm/min., when said temperature is between about 40° and 60° C., employing a unit pressure of about 10 to 15,000 kg/cm$^2$ and processing rate of about 5 to 500 cm/min., when said temperature is between about 60° and 80° C., employing a unit pressure of about 5 to 12,000 kg/cm$^2$ and a processing rate of about 10 to 1,000 cm/min., when said temperature is between about 80° and 120° C., employing a unit pressure of about 3 to 10,000 kg/cm² and a processing rate of about 20 to 2,000 cm/min., when said temperature is between about 120° and 160° C., employing a unit pressure of about 2 to 6,000 kg/cm² and a processing rate of about 30 to 3,000 cm/min., when said temperature is between about 160° to 200° C., employing a unit pressure of about 2 to 4,000 kg/cm² and a processing rate of about 30 to 5,000 cm/min., and when said temperature is between about 200° and 240° C., employing a unit pressure of about 2 to 2,000 kg/cm² and a processing rate of about 50 to 10,000 cm/min.

10. A process as defined in claim 9 further comprising, applying an adhesive between said shaped article and said bonding material.

11. A process as defined in claim 10, wherein said adhesive is selected from the group consisting of unsaturated polyesters, polyvinyl alcohol and epoxy resins.

12. A process as defined in claim 9, wherein said bonding material is selected from the group consisting of nylons, polypropylene, ABS resins, polycarbonates, polyvinyl chloride, cotton, polyethylene terephthalate fiber, hemp, rayons, steel, iron, aluminum, stainless steel, marble, glass, ceramics, cement and copper.

13. A process as defined in claim 9, wherein the shaped article contains at least one high polymer material selected from the group consisting of nylon 6, nylon 610, nylon 8, polybutylene terephthalate, polyethylene, polypropylene and ABS resins in a quantity not greater than 80% by weight.

14. A process as defined in claim 9, wherein the shaped article contains at least one reinforcing agent or filler selected from the group consisting of glass fiber, glass bead, glass powder, quartz, feldspar, cement, carbon, iron, copper, titanium oxide, molybdenum, aluminum, cotton, rayon and hemp in a quantity not greater than 90% by weight.

15. A process as defined in claim 9, wherein the shaped article contains a high polymer material and a reinforcing agent or filler selected from the group consisting of nylon 6, nylon 610, nylon 8, polybutylene terephthalate, polyethylene, polypropylene, ABS resins, glass fiber, glass bead, glass powder, quartz, feldspar, cement, carbon, iron, copper, titanium oxide, molybdenum, aluminum, cotton, rayons and hemp in a total quantity not greater than 90% by weight.

16. A process as defined in claim 9 which comprises:
laminating a cotton layer and a steel plate to a PET plate;
shaping the laminated material into a form of helmet at a processing rate of about 1.5 m/min. under a processing pressure of about 50,000 kg.

17. A process as defined in claim 9 which comprises:
shaping a steel plate into a form of a helmet;
laminating a cotton layer on the helmet of steel;
superimposing a PET plate on the cotton layer of the laminated material at a processing rate of about 150 cm/min. under a pressure of about 10,000 to 30,000 kg (300 to 900 kg/cm²).

18. A process as defined in claim 9, wherein a sandwich consisting of steel and PET is shaped into a cover of drain or water conduit.

19. A process as defined in claim 1 or claim 9, wherein said starting material is molded by an injection molding process from a polyethylene terephthalate resin having a water contentent of not greater than 0.5% by weight, said process comprising:
liquifying said resin in a cylinder having an internal pressure of not greater than 100 mm Hg and an internal temperature within about 30° C. of the melting point of said polyethylene terephthalate resin;
retaining said resin inside the cylinder for not greater than 15 minutes;
injecting said resin into a mold, said mold having a predetermined temperature between about 10 and about 100° C. and a capacity of at least 30% by volume of the total volume of the cylinder; and
filling said mold in a period of not greater than 3 minutes.

20. A process as defined in claim 1 or claim 9 wherein said starting material is molded by an extrusion molding process from a polyethylene terephthalate resin having a water content of not greater than 1% by weight, said process comprising:
liquifying said resin in a cylinder having an internal pressure of not greater than 100 mm Hg and an internal temperature within about 35° C. of the melting point of said polyethylene terephthalate resin;
retaining said resin inside the cylinder for not greater than 10 minutes;
extruding said resin from a nozzle having a predetermined temperature within 20° C. of the melting point of said resin.

21. A process as defined in claim 1 or claim 9 wherein said polyethylene terephthalate comprises at least 80% non-isomeric polyethylene terephthalate.

22. A process as defined in claim 1 or claim 9 wherein said polyethylene terephthalate consists of at least one member of the group consisting of virgin polyethylene terephthalate, chips or pellets regenerated from polyethylene terephthalate scraps or waste articles, and chips or pellets formed by pulverizing polyethylene terephthalate scraps or waste articles.

23. A process as defined in claim 1 or claim 9, wherein PET comprising the starting material has an average molecular weight in the range of 15,000 to 25,000, the forming temperature is in the range of about 5° to about 95° C., the processing pressure is in the range of about 6 to about 10,000 kg/cm², and the processing rate is in the range of about 10 to about 1,500 cm/min.

* * * * *